Sept. 26, 1933.   W. G. KOUPAL ET AL   1,928,024
GLASS ROLLING APPARATUS
Filed May 19, 1932   2 Sheets-Sheet 1
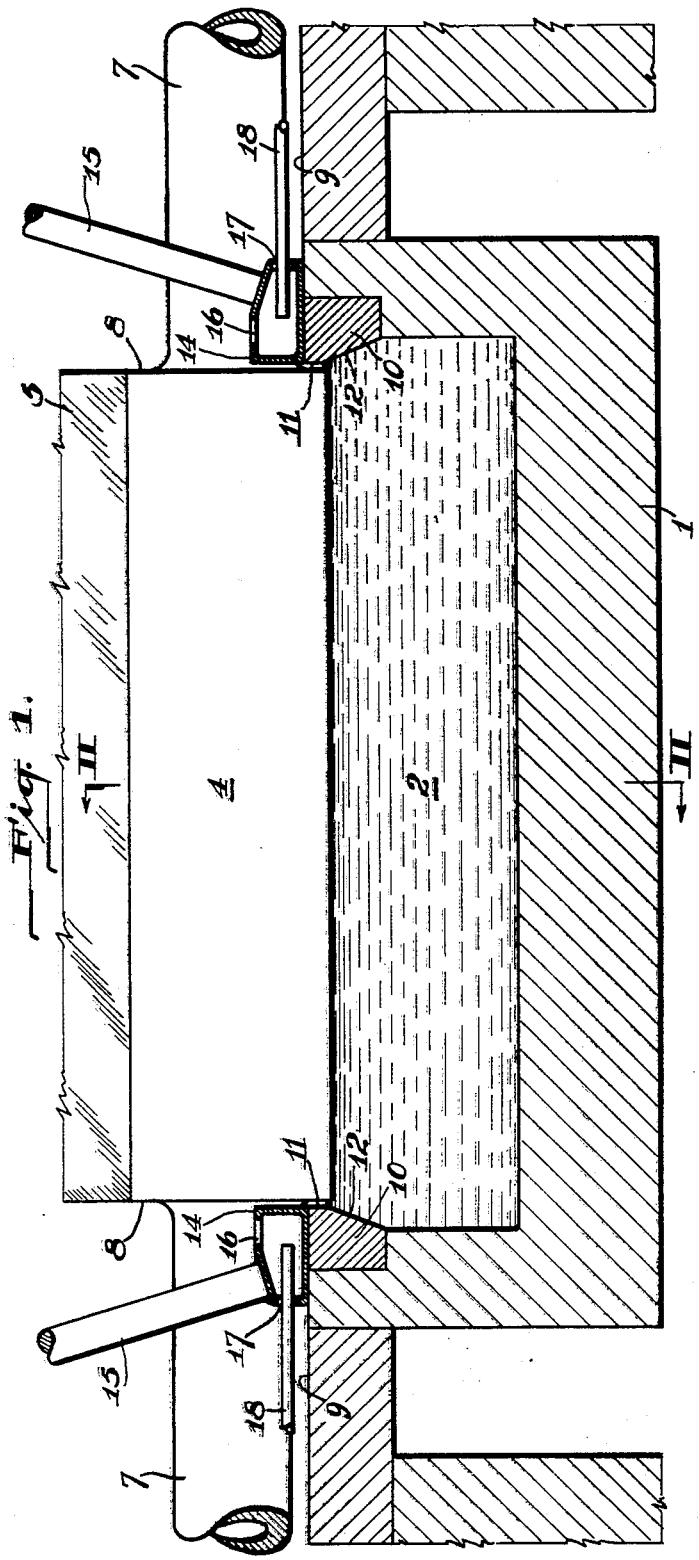
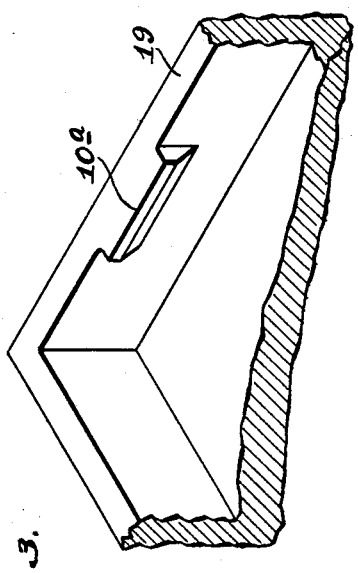
INVENTOR
Walter G. Koupal
and
Charles C. Westall
by Bradley & Bec
attys.

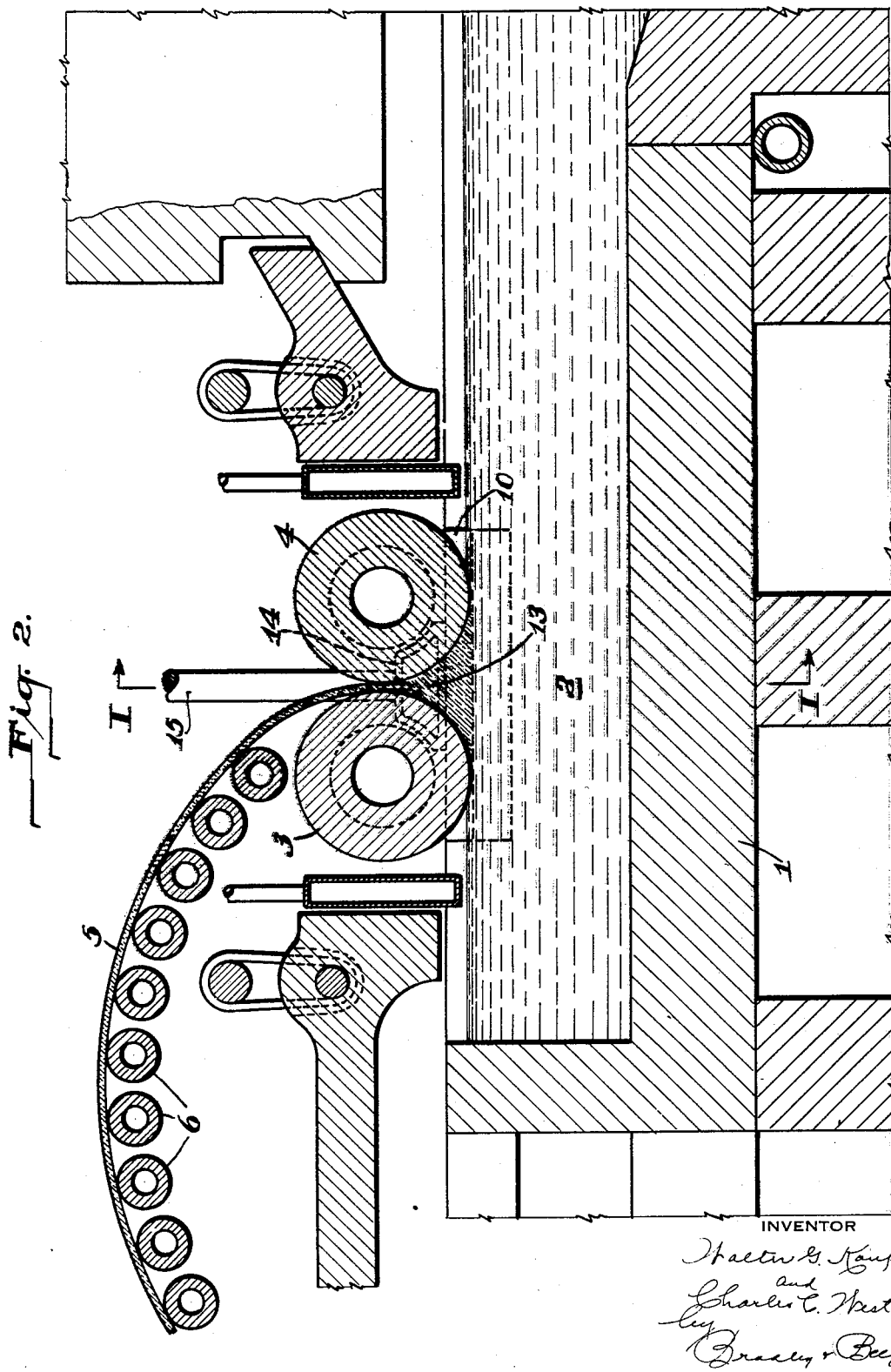

Patented Sept. 26, 1933

1,928,024

UNITED STATES PATENT OFFICE 1,928,024

GLASS ROLLING APPARATUS

Walter G. Koupal and Charles C. Westall, Tarentum, Pa., assignors to Pittsburgh Plate Glass Company, a corporation of Pennsylvania Application May 19, 1932. Serial No. 612,266

4 Claims. (Cl. 49—33)

The invention relates to glass rolling apparatus of the general type shown in the Gelstharp Patent Reissue No. 16,856, dated January 17, 1928, in which a glass sheet is formed continuously between a pair of sizing rolls whose peripheries engage the surface of a molten body of glass, and has to do more particularly with the construction at the ends of the rolls covering the openings of inverted V-shape between the rolls. The invention has for its principal objects the provision of a construction, which will prevent the accumulation of cold glass between the ends of the roll and the side walls of the container; which will avoid the formation of a rough or ragged edge on the glass sheet; and which will avoid the formation of large bubbles at the sheet edges such as occur when the roll end slips through cold glass. Certain embodiments of the invention are illustrated in the accompanying drawings, wherein:

Figure 1 is a section on the line I—I of Fig. 2. Fig. 2 is a section on the line II—II of Fig. 1. And Fig. 3 is a perspective view showing a modification.

As indicated in Figs. 1 and 2, the numeral 1 indicates a draw pot or container for the bath of molten glass 2. This container or draw pot is supplied from a suitable melting tank, not shown. The rolling of the glass is accomplished by a pair of rolls 3 and 4 suitably driven so as to form the glass sheet 5 which is carried over the apron rolls 6, 6, 6, etc. and into a roller leer.

The sizing rolls are similar in construction and each comprises a body portion having a pair of spindles 7, 7 terminating in shoulders 8, 8 at the body portion of the roll. The rolls are located so that their peripheries extend down into the glass bath with a part of the shoulders 8, 8 lying below the upper level 9 of the side walls of the furnace. Mounted in the side walls at the upper ends thereof in opposition to the shoulders 8, 8 are the filler blocks 10, 10 of refractory material, such as clay. The inner face of these filler blocks is divided into two surfaces 11 and 12, the surface 11 lying in a vertical plane and the surface 12 being beveled back until it mergers into the wall of the furnace. The surface 11 comes closely adjacent the shoulder 8 so that the filler block acts as a partial closure of the V-space 13 (Fig. 2) between the rolls. Mounted upon the filler blocks 10, 10 are the hollow metal castings 14, 14 supported by brackets 15 and provided with openings 16 and 17. The members 14 are heated by means of suitable gas burners 18. The members 14 are known in the art as "guns" and their use tends to give the glass sheet a smoother edge than it would otherwise have as is well known in the art.

The provision of the filler members 10, 10 serves to close the spaces which would otherwise exist between the shoulders 8 and the side walls of the pot due to the fact that it is difficult to form the pot so that its inside width exactly corresponds to the length of the body portion of the roll. Such spaces restrict the flow of glass along the pot in the area under the "gun" and as a result a chilling occurs at this point followed by devitrification. This condition produces a ragged edge on the sheet full of vents and encourages the formation of bubbles. The construction as above described prevents the difficulty as above set forth and as a result, a much smoother edge is secured. A further advantage of the construction lies in the fact that the greatest wear in the pot takes place at the ends of the rolls and it is at this point that the pot is injured when the rolls are raised due to the adhesion of the clay to the gun. When a filler block is used, the damage done at this point is much reduced as the cost of replacing the block is slight. A further advantage results from the fact that the glass which goes into the edge of the sheet is hotter when this construction is used since the cooling effect of the side wall of the tank is reduced.

Fig. 3 illustrates a modification in which the filler member 10a is made integral with the side wall 19 of the pot. This construction is lacking in some of the advantages incident to the removable filler block, but in other respects it presents a substantial improvement over the construction heretofore used for the reasons above set forth.

What we claim is:

1. In combination in glass rolling apparatus, a pair of horizontal sizing rolls, each comprising a body portion terminating in shoulders with spindles extending outwardly from said shoulders, a container adapted to carry a body of molten glass with its side walls terminating in opposition to said shoulders, a filler member of refractory material projecting inward from one of the side walls of the tank at the upper edge thereof in close proximity to the shoulders of the rolls and partially filling the V-space between the rolls, and a heated metal gun upon the filler member closing the upper portion of the V-space.

2. In combination in glass rolling apparatus, a pair of horizontal sizing rolls, each comprising a body portion terminating in shoulders with spindles extending outwardly from said shoulders, a container adapted to carry a body of molten glass with its side walls terminating in opposition to said shoulders, a removable filler block of refractory material seated in one of the side walls of the tank at the upper edge thereof in close proximity to the shoulders of the rolls and partially filling the V-space between the rolls, and a heated metal gun seated upon the filler member and closing the upper portion of the V-space.

3. In combination in glass rolling apparatus, a pair of horizontal sizing rolls, each comprising a body portion terminating in shoulders with spindles extending outwardly from said shoulders, a container adapted to carry a body of molten glass with its side walls terminating in opposition to said shoulders a filler member seated in one of the side walls of the container in close proximity to the shoulders of the rolls, said filler member having the upper portion of its side face lying next to the rolls in a vertical plane and its side face below such upper portion beveled back to the side wall in which the member is seated.

4. In combination in glass rolling apparatus, a pair of horizontal sizing rolls, each comprising a body portion terminating in shoulders with spindles extending outwardly from said shoulders, a container adapted to carry a body of molten glass with its side walls terminating in opposition to said shoulders, and a filler member of refractory material seated in one of the side walls of the tank at the upper edge thereof in close proximity to the shoulders of the rolls and constituting a closure means for the V-space between the rolls at their peripheries.

WALTER G. KOUPAL.
CHARLES C. WESTALL.